June 9, 1964 L. P. KEDSON 3,136,898

DIRECT-COUPLED MONOSTABLE SWITCH

Filed Nov. 4, 1959

INVENTOR.
LEONARD P. KEDSON

BY Alfred C. Hill

AGENT

United States Patent Office 3,136,898

Patented June 9, 1964

3,136,898

DIRECT-COUPLED MONOSTABLE SWITCH

Leonard P. Kedson, Belleville, N.J., assignor to International Telephone and Telegraph Corporation, Nutley, N.J., a corporation of Maryland Filed Nov. 4, 1959, Ser. No. 850,968

1 Claim. (Cl. 307—88.5)

This invention relates to electronic switches and more particularly to an electronic switch for switching between two given signal-amplitude levels.

In many varied fields, including the fields of decision theory and signal recognition and analysis, there are occasions when it is necessary to have a circuit which gives a definite indication, such as switching between two given signal-amplitude levels, upon being triggered by a small input signal. It is desirable that such switching circuits include the qualities of rapid switching, high sensitivity, freedom from hysteresis, low cost and simple construction.

Heretofore, the switching function described above could be performed by electromagnetic switching relays, bistable multivibrators, and Schmitt trigger circuits. Electromagnetic swtiching relays are objectionable because of their slow speed, and because they exhibit hysteresis and are subject to mechanical wear. Bistable multivibrators have the disadvantage that they require relatively large input trigger signals to change output states. Schmitt trigger circuits also require large input triggers relative to their output swing, and they exhibit hysteresis. The above-mentioned circuits also tend to be of complex construction.

It is an object, therefore, of the present invention to provide an improved electronic switch overcoming the disadvantages of the prior-art electronic switches.

Another object of the present invention is to provide an improved electronic switch, of the type described, which is capable of high-speed switching, is simple in construction, is low in cost, and has a large output-signal variation in response to low-amplitude input trigger signal.

A feature of the present invention is the provision of an electronic switch for switching between two given potential levels comprising an input and output and means including semiconductor means disposed between said input and output to provide at said output a selected one of said potential levels in accordance with the amplitude of a signal at said input relative to a given reference potential.

Another feature of the present invention is the provision of an electronic switch including a first and second semiconductor device in a cooperative arrangement with respect to a source of first potential equal to one of said potential levels and a source of second potential equal to the other of said potential levels to thereby switch the output potential between these two potential levels.

Figure 1:
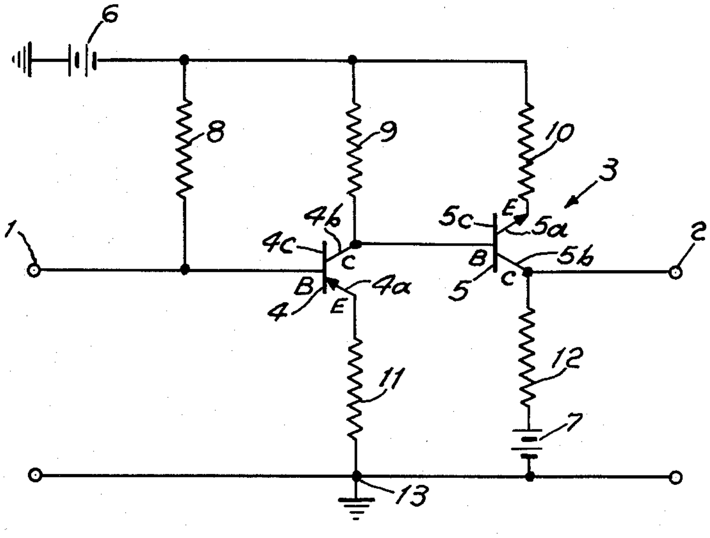
Figure 2:
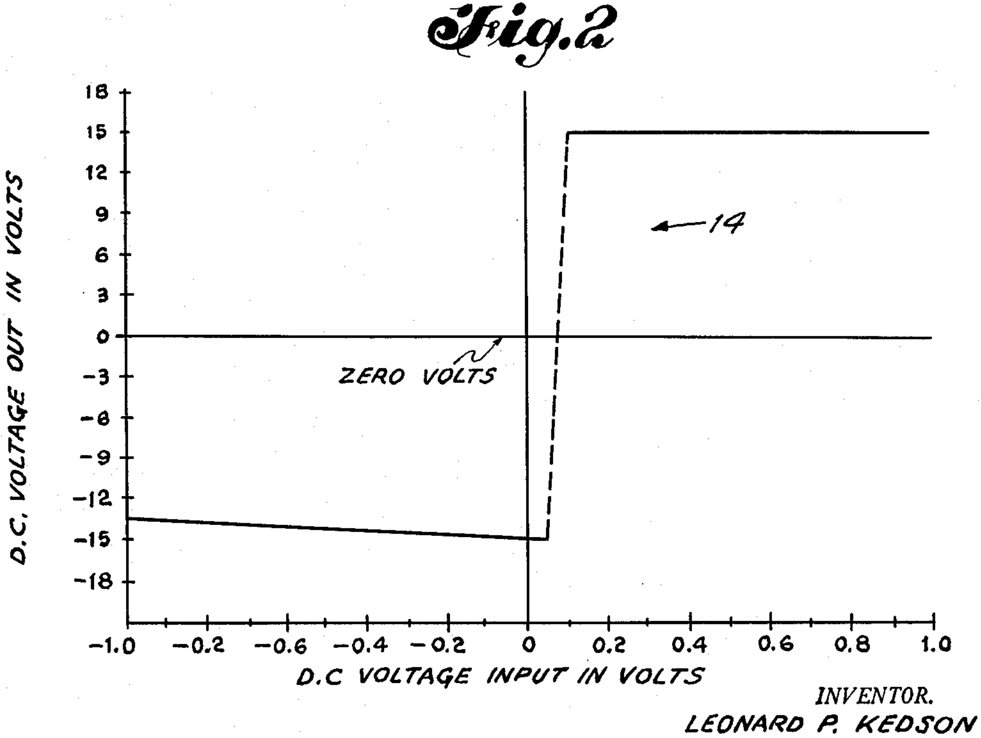

The above-mentioned and other features and objects of this invention will become more apparent by reference to the following description taken in conjunction with the accompanying drawings, in which:

FIG. 1 is a schematic diagram of an electronic switch following the principles of this invention; and FIG. 2 is an illustration of a curve useful in explaining the operation of the present invention.

Referring to FIG. 1, an electronic switch for switching between two given potential levels is shown comprising an input terminal 1 and an output terminal 2 and means including semiconductor means 3 disposed between input terminal 1 and output terminal 2 to provide at output terminal 2 a selected one of said potential levels in accordance with the amplitude of a signal at input terminal 1 relative to a given reference potential.

Semiconductor means 3 includes an arrangement of semi-conductor devices 4 and 5, such as transistors, a source of first potential 6 substantially equal to one of said given potential levels, and a source of second potential 7 substantially equal to the other of said given potential levels. Source 6 and source 7 are coupled respectively to the emitter electrode **5*a* and collector electrode 5*b* of transistor 5 so as to bias transistor 5 to have an operating condition of saturation. Transistor 4 is coupled to source 6 through resistors 8 and 9, resistor 8 being coupled to base electrode 4*c*, and resistor 9 being coupled to collector electrode 4*b*, so that transistor 4 is biased to be conducting very slightly. The emitter 4*a* of transistor 4 is coupled to a reference level 13, illustrated as ground, through resistor 11**.

The switching action of semiconductor device 5 is based on the principle that a transistor, being an active element, when driven from a state of stable equilibrium will rapidly pass through a state of unstable equilibrium and seek another state of stable equilibrium. By biasing transistor 5 in a state of stable equilibrium, such as saturation, which is a condition of low $\beta$, where $\beta$ is defined as the short-circuit current gain for a common-emitter stage and then driving transistor 5 into a state of unstable equilibrium, i.e., a condtion of high $\beta$, the result will be a rapid change in operating condition of transistor 5 as it goes to an operating condition of cut-off, its other state of stable equilibrium and low $\beta$.

In the circuit configuration shown in FIG. 1, the bias constraints on transistors 4 and 5 are chosen so that transistor 5 is at saturation, conducting very heavily, and transistor 4 is conducting very slightly. Emitter **4*a* of transistor 4 is at a slightly negative potential with respect to reference level 13, and collector 4*b* is at a large negative potential with respect to said reference level. Base 5*c* of transistor 5 is at the same potential as collector 4*b*, and emitter 5*a* is at a large negative potential, more negative than base 5*c* but less negative than the potential of source 6 due to the voltage drop in resistor 10. Due to the heavy conduction of transistor 5 in its saturated operating conidtion, collector 5*b* is at a large negative potential, slightly less negative than emitter 5*a* and less negative than the potential of source 6. Thus, due to these biasing conditions, transistor 5** is in a stable operating condition.

If the potential at base **5*c* were to be driven more negative, emitter 5*a* would correspondingly become more negative until the potential of emitter 5*a* became equal to the potential of source 6. At this point, emitter 5*a* cannot go any further negative. These combined conditions cause transistor 5 to be in an unstable operating condition, that is, to be driven into its high-$\beta$ region. Transistor 5 will rapidly seek stability and pass through its high-$\beta$ region to its other stable operating condition of cut off. When transistor 5 is at cut off, the potential of collector 5*b* becomes substantially equal to the potential of source 7. Output terminal 2 is coupled directly to collector 5*b***, so that the potential of output terminal 2 is substantially equal to the potential of source 6 when transistor 5 is at saturation and rapidly changes to a value substantially equal to the potential of source 7 when transistor 5 switches to cut off. The switching operation of transistor 5 can therefore cause a large potential change at output terminal 2. It will be understood that the potential of output terminal 2 can be substantially equal to the potenial of source 6 when transistor 5 is in saturation only because of the fact that resistor 10 has a very small value and, hence, has a low voltage drop across it when the emitter current of transistor 5 flows therethrough. Reference to the table of typical component values, which appears later in the specification, shows that the value of resistor 10 is indeed small in comparison with the value of resistor 12, which is in the collector circuit of transistor 5.

For a more detailed explanation of the present invention, consider the circuit shown in FIG. 1 as being in its initial condition wherein transistor 5 is at saturation and output terminal 2 is at a potential substantially equal to the potential of source 6. A positive-going input signal applied to input terminal 1 will tend to cut off transistor 4, that is, it will cause slightly negative emitter 4*a* to become more positive until it becomes equal in potential to reference potential 13. Collector 4*b* will become more negative, causing base 5*c* of transistor 5 to also become more negative. Emitter 5*a* of transistor 5 follows base 5*c* and becomes more negative until it becomes equal in potential to the potential of source 6. Base 5*c*, under the influence of collector 4*b*, however, continues to increase negatively in potential due to the positively increasing input signal at input terminal 1. These conditions cause a state of instability to occur at transistor 5 as pointed out hereinabove so that transistor 5 can no longer remain in the saturated condition. In other words, transistor 5 has been induced to enter a high-$\beta$ region by the relative potentials on its electrodes. Transistor 5 rapidly passes through the unstable high-$\beta$ region to seek its other stable state, i.e. cut-off. When transistor 5 changes states, collector 5*b* will change potential from a value substantially equal to the potential of source 6 to a value equal to the potential of source 7. This in turn causes the potential at output terminal 2, which is coupled to collector 5*b*, to undergo the same potential change. Since the input signal at input terminal 1 which caused the switching of transistor 5 is relatively small in comparison to the ultimate change in potential at output terminal 2, and since the switching time of transistor 5 is very rapid, it is seen that the circuit shown in FIG. 1 can be used as a high-speed switch wherein a large output voltage may be switched, upon the occurrence of a relatively small-amplitude input signal, without exhibiting hysteresis.

The above discussion was presented, for the sake of clarity, in terms of the effects of a constantly increasing input signal. It is to be understood, however, that the input signal may be an abrupt pulse. The only requirement on the input signal is that it must be of a sufficient amplitude to cause the instability and subsequent switching of transistor 5.

After switching, and with transistor 5 cut off, if the input signal at input 1 decreases below the critical value, the orginal bias constraints will again control the state of transistors 4 and 5. Emitter 4*a* of transistor 4 will return to its slightly negative value, and collector 4*b* will become less negative, thereby causing base 5*c* of transistor 5 to become less negative. Emitter 5*a* correspondingly becomes less negative, with the result that the condition tending to cause instability is removed. Transistor 5 rapidly switches back to its saturated condition, and the potential at output terminal 2 switches back to a voltage substantially equal to the potential of source 6.

The circuit shown in FIG. 1 is, therefore, a monostable device which can be caused to change outputs upon the occurrence of a relatively small-amplitude trigger signal, and which will return to its original output when said trigger signal is removed, without exhibiting hysteresis since there is no regeneration in the circuit.

In a reduction to practice of the circuit shown in FIG. 1, the following are typical values of the various components and voltages.

| | | |
|---|---|---|
| Resistor 8 | ohms | 10K |
| Resistor 9 | do | 2.7K |
| Resistor 10 | do | 56 |
| Resistor 11 | do | 100 |
| Resistor 12 | do | 22K |
| Transistor 4 | | 2N43 |
| Transistor 5 | | 2N333 |
| Battery 6 | volts | 15 |
| Battery 7 | do | +15 |

With the above-valued components located in their appropriate positions, the circuit shown in FIG. 1 is capable of switching the potential at output terminal 2 through almost 30 volts (−15 volts to +15 volts) upon the occurrence of an input signal of 50 millivolts applied to input terminal 1, the result being an effective D.C. voltage gain of 600. The switching time required is approximately 0.2 microsecond.

Referring to FIG. 2, curve 14 illustrates the output-voltage change for input-voltage signals for the circuit of FIG. 1 when said circuit employs the various component values listed hereinabove.

It is seen from curve 14 that, with zero input signal at input terminal 1, the output voltage at ouput terminal 2 is substantially equal to −15 volts, the voltage value of source 6. When the input signal has a value of 50 millivolts, transistor 5 becomes unstable and passes rapidly through its high-$\beta$ region as described hereinabove. The transition of the potential of output terminal 2 due to the switching of transistor 5 is shown by the dotted-line portion of curve 14, and it is observed that the output potential at output terminal 2 switches from approximately −15 volts to +15 volts. The time required for the total change in output potential was found to be approximately 0.2 microsecond, but this time value could be improved by employing high-speed transistors.

The advantages of the present invention are its rapid action, its ability to operate with a relatively low-amplitude input signal, and the fact that no hysteresis is exhibited.

It is to be understood that, although the circuit shown in the drawing illustrates transistor 4 as being a p-n-p type transistor and transistor 5 as being an n-p-n type transistor, it would be possible to reverse the sequence and have transistor 4 be an n-p-n type transistor and transistor 5 be a p-n-p type transistor, as long as the potentials of sources 6 and 7 were correspondingly reversed.

It is to be further understood that it is possible to operate the circuit shown in FIG. 1 with a negative input signal. To cause switching with a negative input signal only requires that transistor 5 be initially biased to cut off, and caused to be driven to saturation. The circuit shown in FIG. 1 could be employed, with modification in bias constraints, to provide an initial condition of cut off for transistor 5.

While I have described the principles of my invention in connection with specific apparatus, it is to be clearly understood that this description is made only by way of example and not as a limitation to the scope of my invention as set forth in the objects thereof and in the accompanying claim.

I claim:

An electronic switch for switching between two given potential levels on opposite sides of a reference-potential level, comprising reference-potential means characterized by a reference-potential level, a source of first potential substantially equal to one of said given potential levels and having a first polarity with respect to said reference-potential level, a source of second potential substantially equal to the other of said given potential levels and having a second polarity opposite to said first polarity with respect to said reference-potential level, a first transistor device coupled through emitter and collector impedances between said reference-potential means and said source of first potential, the base of said first transistor device being returned through a base impedance to the terminal of said collector impedance remote from said first transistor device, a second transistor device having a base electrode coupled to the collector electrode of said first transistor device, output means connected to the collector electrode of said second transistor device, said second transistor device being connected through emitter and collector impedances between said source of first potential and said source of second potential respectively to establish a normal operating condition of saturation for said second transistor device so that said output means is substantially at said first potential level, and means for supplying an input signal to said first transistor device to produce an output signal therefrom rendering said second transistor device cut off and switching the potential at said output means to a value substantially equal to said second potential level.

References Cited in the file of this patent

UNITED STATES PATENTS

| | | |
|---|---|---|
| 2,772,410 | Logue et al. | Nov. 27, 1956 |
| 2,773,981 | Goodall | Dec. 11, 1956 |
| 2,835,829 | Sourgens et al. | May 20, 1958 |
| 2,892,165 | Lindsay | June 23, 1959 |
| 2,998,487 | Hilbourne | Aug. 29, 1961 |
| 3,023,323 | Kojalowicz | Feb. 27, 1962 |
| 3,089,962 | Foote | May 14, 1963 |

OTHER REFERENCES

Transistor Circuit Engineering, by Shea, pp. 393 and 394.